(12) United States Patent
Dayet et al.

(10) Patent No.: US 9,174,496 B2
(45) Date of Patent: Nov. 3, 2015

(54) TREAD COMBINING INSERTS AND SIPES

(75) Inventors: Patrick Dayet, Clermont-Ferrand-Cedex 9 (FR); Jacky Pineau, Clermont-Ferrand-Cedex 9 (FR); Richard Abinal, Clermont-Ferrand-Cedex 9 (FR); Bernard Villeneuve, Clermont-Ferrand-Cedex 9 (FR)

(73) Assignees: COMPAGNIE GENERALE DES ESTABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 29 days.

(21) Appl. No.: 14/116,988

(22) PCT Filed: Apr. 26, 2012

(86) PCT No.: PCT/EP2012/057657
§ 371 (c)(1),
(2), (4) Date: Feb. 3, 2014

(87) PCT Pub. No.: WO2012/152593
PCT Pub. Date: Nov. 15, 2012

(65) Prior Publication Data
US 2014/0166173 A1 Jun. 19, 2014

(30) Foreign Application Priority Data
May 11, 2011 (FR) .................................... 11 54082

(51) Int. Cl.
*B60C 11/12* (2006.01)

(52) U.S. Cl.
CPC ......... *B60C 11/1263* (2013.04); *B60C 11/1218* (2013.04); *B60C 11/1281* (2013.04); *B60C 2011/0369* (2013.04)

(58) Field of Classification Search
CPC ................... B60C 2011/12; B60C 2011/1204; B60C 2011/1209; B60C 2011/1218; B60C 2011/1222; B60C 2011/1231; B60C 2011/1263; B60C 2011/1281; B60C 2011/036; B60C 2011/0369; B60C 2011/0367; B60C 2011/02; B60C 2011/0323; B60C 2011/13
USPC .......... 152/209.25, 209.18, 209.6, 210, 154.2
See application file for complete search history.

(56) References Cited

U.S. PATENT DOCUMENTS 2,121,955 A * 6/1938 Eger ......................... 152/209.18
2,938,560 A * 5/1960 Wallace et al. .......... 152/209.22

(Continued)

FOREIGN PATENT DOCUMENTS

DE 1480889 A1 2/1969
WO 0160641 A1 8/2001

(Continued)

OTHER PUBLICATIONS

PCT/EP2012/057657—International Search Report (English translation included), dated Jul. 19, 2012, 4 pages.

*Primary Examiner* — Eric Hug
(74) *Attorney, Agent, or Firm* — Dickinson Wright PLLC

(57) ABSTRACT

Tire tread comprising a tread surface intended to come into contact with a roadway, this tread comprising at least one sipe extending in a main direction D and of mean width E, this sipe comprising in the main direction D at least one part sipe of shallow depth HF and at least one part sipe of great depth HG, the depth HF being less than the depth HG, each part sipe of shallow depth and each part sipe of great depth comprising an end region, this tread further comprising at least one insert oriented in a direction different from the main direction D of the sipe, this insert being positioned wholly within the thickness of the tread so as to be situated radially on the inside of a part sipe of shallow depth HF, this tread being such that at least the part sipe of shallow depth HF situated radially on the outside of the insert is provided, at its end region, with a widening forming a channel of maximum width W, this maximum width W being greater than the mean width E of the sipe.

4 Claims, 2 Drawing Sheets

(56) References Cited

U.S. PATENT DOCUMENTS

| | | | | |
|---|---|---|---|---|
| 3,012,599 | A * | 12/1961 | Benson et al. | 152/209.22 |
| 2003/0047263 | A1 * | 3/2003 | Lopez | 152/209.22 |
| 2004/0016491 | A1 | 1/2004 | Martin et al. | |
| 2004/0089384 | A1 * | 5/2004 | Lopez et al. | 152/154.2 |
| 2007/0095447 | A1 * | 5/2007 | Nguyen et al. | 152/209.18 |
| 2009/0159167 | A1 * | 6/2009 | Scheuren | 152/209.18 |
| 2012/0234443 | A1 * | 9/2012 | Kurokawa et al. | 152/209.18 |

FOREIGN PATENT DOCUMENTS

| | | | |
|---|---|---|---|
| WO | | 02060705 A1 | 8/2002 |
| WO | WO 2011/049062 | * | 4/2011 |

* cited by examiner

TREAD COMBINING INSERTS AND SIPES

This application claims benefit of the filing date of PCT/EP2012/057657, filed Apr. 26, 2012, which claims the benefit of FR1154082, filed May 11, 2011, the entire contents of each of which are incorporated herein by reference for all purposes.

BACKGROUND

1. Field

The present invention relates to tire treads and notably to the sipes with which these treads may be provided. It also relates to the treads comprising inserts intended to form new grooves after these treads have become partially worn, these treads also comprising sipes according to the invention.

2. Description of Related Art

It is known practice to form a tread having a tread surface that is intended to come into contact with a roadway, this tread having sufficient thickness to allow a satisfactory service distance to be covered through wear. It is known practice to provide the tread of a tire intended to be fitted to a passenger vehicle with a plurality of grooves the depth of which is suited to the grooves being present and effective throughout the service life. In combination with these grooves there are a plurality of sipes which make it possible to generate a great many edge corners of material without, however, excessively reducing the stiffness of the tread and without excessively increasing the voids volume of this tread.

In order to obtain in the initial state (which means as it leaves the mold) a suitable level of stiffness while at the same time ensuring a high number of voids at the end of life so that the tire has a great deal of wet grip, it has been proposed that new grooves be generated once tire wear reaches a certain level by either forming channels inside the tread or by introducing into the tread at least one insert which, when removed, forms a new grooves as described for example in patent document BE-399026-A.

In the latter instance, it is advantageous to combine both the presence of at least one insert and a plurality of sipes the orientation of which intersects the orientation of the insert.

During testing it has been found that movements of unvulcanized material can occur during the tire molding operation; these movements of material are not without impact on the geometry of the constituent parts and, more particularly of the inserts themselves that is obtained, and this can lead to a reduction in the running performance of the tire. In particular, it has been found that, with wear of the tread, the switchover from the sipe to the new groove formed by the insert is sometimes nonuniform and that can present problems.

It is an object of the invention to prevent such a problem.

SUMMARY

In order to achieve that, there is proposed a tire tread comprising a tread surface intended to come into contact with a roadway, this tread comprising at least one sipe extending in a main direction D (this direction is considered on the tread surface) and of mean width E, this sipe comprising in the main direction D at least one part of shallow depth HF and at least one part of great depth HG, the depth HF being less than the depth HG, each part of shallow depth and each part of great depth comprising an end region in the depth of the tread, this tread further comprising at least one insert oriented in a direction different from the main direction D of the sipe, this insert being positioned wholly within the thickness of the tread so as to be situated radially on the inside of a part sipe of shallow depth HF.

This tread is also such that at least the part sipe of shallow depth HF situated radially on the outside of the insert is provided, at its end region,—namely the region furthest from the tread surface, with a widening forming a channel of mean width W, this mean width W being greater than the mean width E of the sipe.

DEFINITIONS

A block is a raised element formed on a tread, this element being delimited by voids or grooves and comprising lateral walls and a contact face, the latter being intended to come into contact with the roadway during driving.

A rib is a raised element formed on a tread, this element being delimited by two grooves. A rib comprises two lateral walls and a contact face, the latter being intended to come into contact with the roadway.

A radial direction means a direction perpendicular to the axis of rotation of the tire (this direction corresponds to the direction of the thickness of the tread).

An axial or transverse direction means a direction parallel to the axis of rotation of the tire.

A circumferential direction means a direction tangential to any circle centered on the axis of rotation. This direction is perpendicular both to the axial direction and to a radial direction.

A cut means either a groove or a sipe and corresponds to the space delimited by walls of material facing one another and distant from one another by a non-zero distance. It is precisely this distance which differentiates between a sipe and a groove; in the case of a sipe, this distance is determined to allow the walls facing one another to come into contact in the contact patch in which that portion of the tire is in contact with a roadway. This distance, in the case of a sipe, as a general rule for a passenger vehicle tire is at most equal to 2 millimeters (2 mm). In the case of a groove, the walls delimiting this groove cannot come into contact with one another under normal driving conditions. For a tire intended for a passenger vehicle, this width can be considered to be greater than 2 mm.

The main direction of a cut corresponds to the mean direction passing through the most widely spaced points of the edge corners formed by the cut on the tread surface in the new state.

The secondary direction of a cut is defined as the direction perpendicular to the main direction of an incision and extending into the thickness of the tread. This direction corresponds to the direction of the depth of the cut.

A first part is said to be situated radially on the inside of a second part when this first part is situated between the axis of rotation of the tire and this second part.

By virtue of the invention there is obtained a tread the paths of the inserts of which are disrupted as little as possible by the penetration of the blades that mold the sipes having first directions different from those of the inserts and there is thus obtained a tread that exhibits uniform wear performance. Furthermore, the transition between the sipe and the new groove as the tread wears is improved by the arrangement according to the invention.

According to one variant of the invention, the tread according to the invention is such that the mean width W of the channel is at least equal to three times the mean width E of the sipe.

According to a variant, the tread according to the invention is such that the sipe comprises a part of reduced depth HF flanked in the main direction D by parts of greater depth HG.

According to a variant, the tread according to the invention is such that all the sipes radially surmounting an insert are provided with a channel of mean width W in their end regions furthest towards the inside of the tread.

According to another variant of the invention, the tread is such that the channel when viewed in cross section has a circular shape which is truncated to form a channel bottom with flat or substantially flat geometry, this channel bottom being the part of the channel furthest from the tread surface and closest to the insert.

According to one variant of the invention, the tread is such that there is a thickness of rubber other than zero between the part sipe of reduced depth and the channel running under said part sipe, this thickness being at least equal to the width E of the sipe.

Advantageously and irrespective of the variant described hereinabove, a sipe according to the invention may also have an overall shape that exhibits waviness or zigzags so as to limit the reduction in stiffness associated with the presence of this sipe. Likewise, these sipes may be inclined with respect to the tread surface, i.e. in such a way that they are not perpendicular to this surface.

Other features and advantages of the invention emerge from the description given hereinafter with reference to the attached drawings which, by way of nonlimiting examples, show variant embodiments of the subject matter of the invention.

DETAILED DESCRIPTION OF SPECIFIC EMBODIMENTS

In the figures that accompany this description, the same reference symbols can be used to describe variants of the invention when these reference symbols refer to elements of the same nature, whether this be a structural nature or a functional nature.

Figure 1:
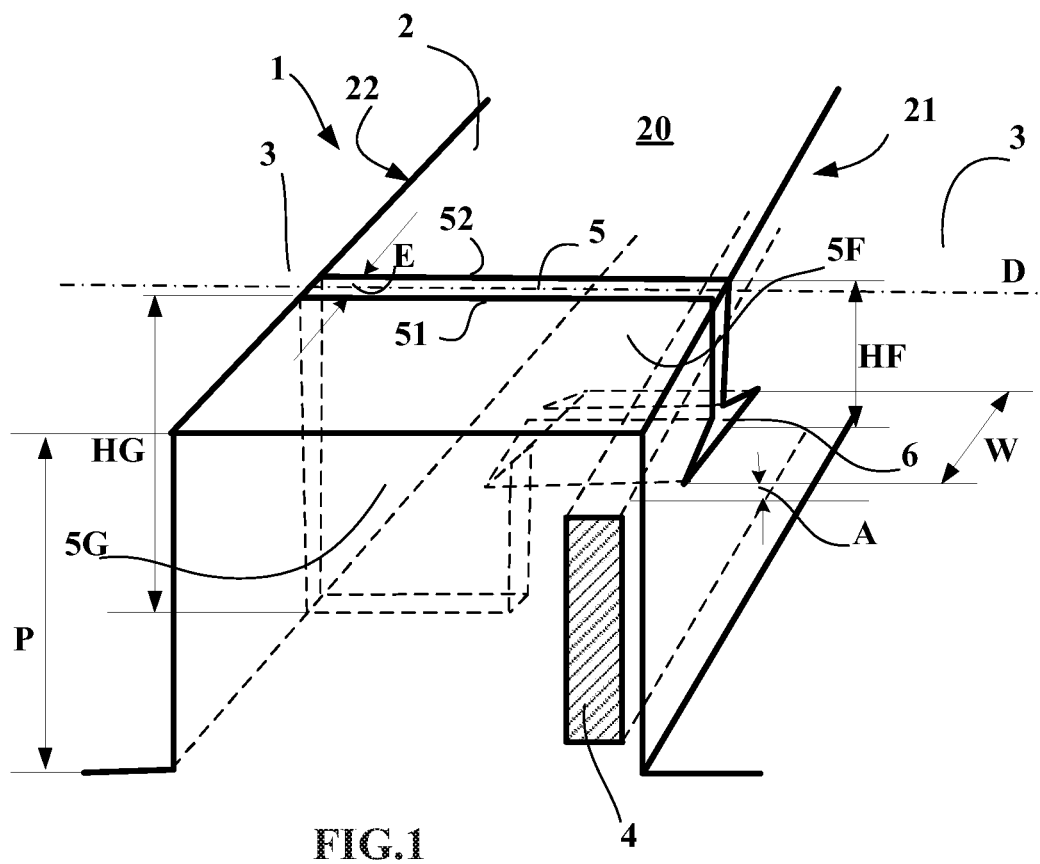
FIG. 1 shows a view of a raised element of a tread according to the invention, comprising an insert surrounded by a sipe.

FIG. 1 shows a view of a raised element of a tread according to the invention comprising an insert surrounded by a sipe.

This FIG. 1 shows part of a rib 2 of a tread 1 of a tire for a passenger vehicle, this rib 2 being delimited by grooves 3 of circumferential orientation and depth P. This rib 2 comprises two lateral faces 21, 22 bounding the circumferential grooves and a contact face 20 intended to come into contact with a roadway during driving. The circumferential grooves 3 have a depth P—when the tread is in the new state, which corresponds substantially to the height of material that can be worn away during driving before the tire needs to be changed. Inside this rib 2 can be seen an insert 4 formed of a material resistant to the molding of the tire and intended to be removed or automatically eliminated during driving when tread wear reaches a suitable level so as to create new grooves opening onto the tread surface following this partial wear. This insert 4 is arranged in such a way as to extend essentially in the circumferential direction so that it is entirely contained within the rib 2.

In order to obtain a satisfactory effect notably in terms of applying power, this rib 2 further comprises a plurality of sipes 5 of width E—here equal to 0.6 mm, these sipes 5 running perpendicular to the contact face 20 of the rib 2. Each sipe 5 forms on the tread surface edge corners 51, 52 that are parallel to one another; these edge corners define, between their most widely spaced points, a main direction of the sipe (here denoted D).

This sipe 5 is formed of two parts in its main direction D: a part of shallow depth 5F, denoted HF, and a part of greater depth 5G, denoted HG. In this instance, the depth HF of the shallow-depth part is equal to half the depth P of the circumferential grooves 3 whereas the depth HG is substantially equal to this depth P of the circumferential grooves 3.

The shallow-depth part 5F comprises an end part 6 which is widened in comparison with the width E of the sipe, this widened part 6 radially surmounting the insert 4 (i.e. being situated between the insert 4 and the contact face 20). In the case shown, the widened part 6 has a cross section of triangular shape, one of the side of this triangle running parallel to the circumferential direction of the insert and being of width W. Between this widened part 6 and the insert 4 there is a quantity of material of small but non-zero thickness A (at least 0.2 mm and preferably at least 0.5 mm) so as to avoid any interference between the insert 4 and the molding element that molds a sipe intersecting with this insert during the tread molding operation (intersecting the insert here meaning that the main direction D of the sipe 5 differs from the direction of the insert).

Figure 2:
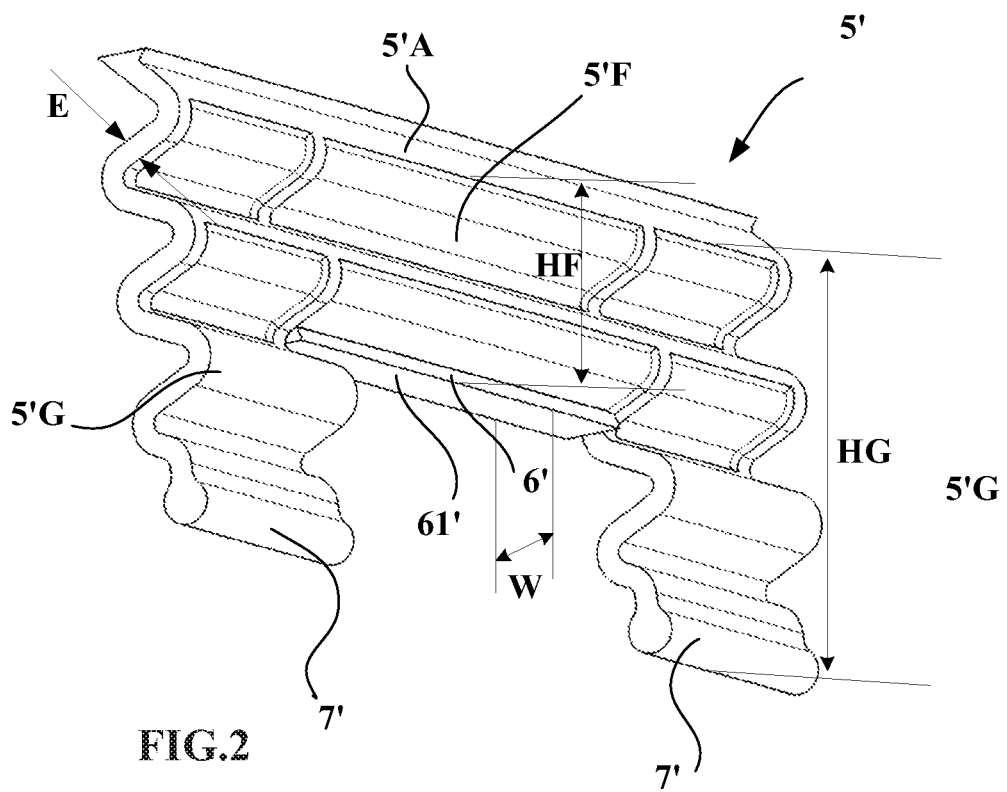
FIG. 2 shows a view of a molding element for molding one variant of sipe in a tread according to the invention.

FIG. 2 shows a view of a molding element 5' for molding a variant sipe in a tread according to the invention. In this variant, this molding element 5' comprises an anchorage region 5'A designed to be mounted in a mold, this anchorage region being extended by two parts of height HG (these parts are identified 5'G) and one part of height HF (this part is identified 5'F), the height HG being greater than the height HF. The parts of height HG flank the part of height HF.

This molding element 5' allows for the molding of a sipe comprising two part sipes of great depth HG which, in the main direction of the sipe, flank a part sipe of shallower depth HF.

Moreover, all the part sipes 5'G and 5'F are wavy in the direction of their height (corresponding to the depth of the molded sipe) so as to create mechanical interlocking between the opposing walls that delimit said sipe.

Furthermore, the reduced depth part 5'F ends in an end region 6' the cross section of which is semicircular of width W and in this instance equal to 3 mm. This end region 6' comprises a flat part 61' which is positioned in such a way as to be closest to an insert during the molding of a tire, but without touching it of course. Furthermore, the other ends of the great depth parts 5'G are provided with widenings 7' of cylindrical circular shape so as to reduce stress concentrations locally in the known way.

Figure 3:
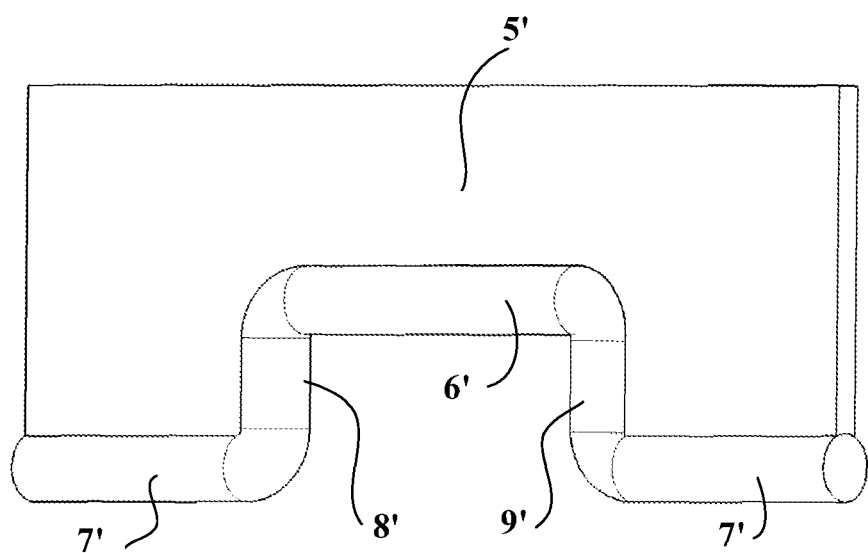
FIG. 3 shows a view of another molding element for molding a variant of sipe in a tread according to the invention.

In a last variant described here, a continuity is created, as can be seen in FIG. 3, between the end regions of the large-height parts 5'G and the small-height one 5'F. The widenings 7' formed on the large-height parts 5'G and the widening 6' formed on the smaller-height central part 5'F are connected to one another by widened parts 8' and 9' running along the interior edge of each large-height part. This is both advantageous in terms of the manufacture of the molding element itself and during the molding of a tread because all the parts of the element that can interfere with the insert are delimited by widenings.

Now that the invention has been described in general terms and by means of a number of variants, it must be understood that it is not, however, restricted to these variants alone. It is clear that various modifications can be made thereto without departing from the overall scope of the present invention as claimed.

In all the cases presented, a person skilled in the art will be able to adapt the shape of each sipe, notably by planning the presence of means able to limit the relative movements of one face with respect to the face opposite (for example by planning the formation of interacting reliefs that limit or even block any relative movement of said faces).

The invention claimed is:

1. A tire tread comprising:
   a tread surface intended to come into contact with a roadway, this tread comprising:
      at least one sipe extending in a main direction D and of mean width E, this sipe comprising:
         in the main direction D at least one part sipe of shallow depth HF and at least one part sipe of great depth HG, the depth HF being less than the depth HG, each part sipe of shallow depth and each part sipe of great depth comprising:
            an end region,
      at least one insert oriented in a direction different from the main direction D of the sipe, this insert being positioned wholly within the thickness of the tread so as to be situated radially on the inside of a part sipe of shallow depth HF,
   wherein at least the part sipe of shallow depth HF situated radially on the outside of the insert is provided, at its end region, with a widening forming a channel of maximum width W, this maximum width W being greater than the mean width E of the sipe,
   wherein the channel when viewed in cross section has a circular shape which is truncated to form a channel bottom with flat geometry, this channel bottom being the part of the channel furthest from the tread surface,
   wherein there is a thickness A of rubber other than zero between the part sipe of shallow depth and the insert running under said part sipe, this thickness of rubber being at least equal to the width E of the sipe.

2. The tire tread according to claim 1 wherein the maximum width W of the channel is at least equal to three times the mean width of the sipe.

3. The tire tread according to claim 1 wherein the sipe comprises a part of shallow depth HF flanked in the main direction D by parts of great depth HG.

4. The tire tread according to claim 3 wherein all the sipes radially surmounting an insert are provided with a channel of mean width W in their end regions furthest towards the inside of the tread.

* * * * *